United States Patent [19]

Sequin

[11] 3,801,884

[45] Apr. 2, 1974

[54] CHARGE TRANSFER IMAGING DEVICES

[75] Inventor: Carlo Heinrich Sequin, Summit, N.J.

[73] Assignee: Bell Telephone Laboratories, Incorporated, Murray Hill, N.J.

[22] Filed: Dec. 18, 1972

[21] Appl. No.: 316,105

Related U.S. Application Data

[63] Continuation-in-part of Ser. No. 235,741, March 17, 1972, abandoned.

[52] U.S. Cl....... 317/235 R, 317/235 G, 317/235 N, 307/221 D

[51] Int. Cl. ............................................ H01l 11/14

[58] Field of Search ................................. 317/235 G

[56] References Cited

OTHER PUBLICATIONS

Electronics, "The New Concept for Memory & Imaging Charge Coupling" by Altman, June 21, 1971 pages 50–59.

*Primary Examiner*—Jerry D. Craig

*Attorney, Agent, or Firm*—L. H. Birnbaum

[57] ABSTRACT

Charge transfer imaging devices are described which perform a psuedo-interlacing operation. A unit cell is provided which in its vertical dimension occupies the space corresponding to two lines in the display. Means are provided for integrating charge under alternate phases of the charge transfer drive mechanism in alternate fields in order to shift the center of charge collection. The device may be in the form of an area imaging device of the frame transfer and store type, or a line imaging device. Both charge coupled and bucket brigade devices may be constructed in accordance with the invention.

13 Claims, 7 Drawing Figures

PATENTED APR 2 1974

3,801,884

SHEET 2 OF 4

CHARGE TRANSFER IMAGING DEVICES

CROSS REFERENCE TO RELATED APPLICATION

This application is a continuation-in-part of applicant's copending application, Ser. No. 235,741, filed Mar. 17, 1972 and assigned to the present assignee now abandoned.

BACKGROUND OF THE INVENTION

This invention relates to all solid state imaging devices employing the charge transfer device concept, and in particular to devices which may be adapted for video systems requiring an interlacing operation.

"Charge Transfer Device" (CTD) is by now the well-known generic description for devices which store and transfer charge carriers in a storage medium by means of appropriate potentials applied to series of electrodes disposed upon an insulating layer overlying one surface of the medium. These devices may be of the charge coupled (CTD) or bucket brigade (BBD) type. In the basic Bucket Brigade Device, regions of fixed charge are provided in the storage medium beneath each electrode and extending slightly into the area below an adjacent electrode in the charge transfer path. When an electrode is pulsed, the region of charge immediately under it is reverse biased and the channel between this region and its neighbor is inverted to permit the transfer of charge. Thus, mobile charge carriers are stored in fixed charge regions as majority carriers and transferred through the channels as minority carriers. The basic charge coupled device stores charge carriers under depletion biased electrodes and transfers the charge carriers by creating a succession of potential wells at the storage medium surface along the transfer path. Charge is therefore stored and transferred in the form of discrete packets of minority carriers in the medium.

One method of generating charge carriers in a semiconductor storage medium is to create hole-electron pairs in the material by photon absorption. It was therefore suggested that the CTD could operate as an imaging device wherein mobile charge carriers were formed in proportion to incident light, collected in localized integration sites (the potential wells of the CCD or fixed charge regions of the BBD) and read out by successively biasing a series of the electrodes. In order to prevent smearing during readout, it was proposed that the device comprise two arrays of electrodes, one functioning as an optical sensing array and the other as a storage and readout array. (See U.S. Pat. application of M. F. Tompsett, Ser. No. 285,054, filed, Aug. 30, 1972). In such a device an entire frame of carriers is transferred rapidly in a parallel fashion from beneath the optical sensing array to beneath the storage and readout array. The charge is then read out in parallel to serial fashion from beneath the latter array while charge is being collected under the optical sensing array in the next frame. This device has come to be known as the "frame transfer and store" imaging device.

In certain video systems, the full information contained in a whole frame is displayed in two interlaced fields to avoid flicker in the display. In such systems, this usually requires that the imaging device deliver the information in the same interlaced form, i.e., all odd lines in a first field and all even lines in a second field. It will be appreciated that in the frame transfer and store type of device, since the information is transferred in a parallel to serial fashion, such a readout operation cannot be performed without additional information processing schemes.

It is therefore the primary object of the invention to provide an imaging device of the frame transfer and store type which can be easily adapted for video systems requiring an interlaced operation.

SUMMARY OF THE INVENTION

This and other objects are achieved in accordance with the invention which performs a psuedo-interlacing operation that is compatible with present interlaced systems. A unit cell in the optical sensing array has a vertical dimension which covers the space corresponding to two lines in the display. Vertical resolution is nearly maintained by providing means for integrating under alternate rows of the optical sensing array in alternate fields, thereby shifting the center of charge collection.

BRIEF DESCRIPTION OF THE DRAWING

These and other features of the invention will be delineated in detail in the description to follow and in the drawing in which.

DETAILED DESCRIPTION OF THE INVENTION

Figure 1:
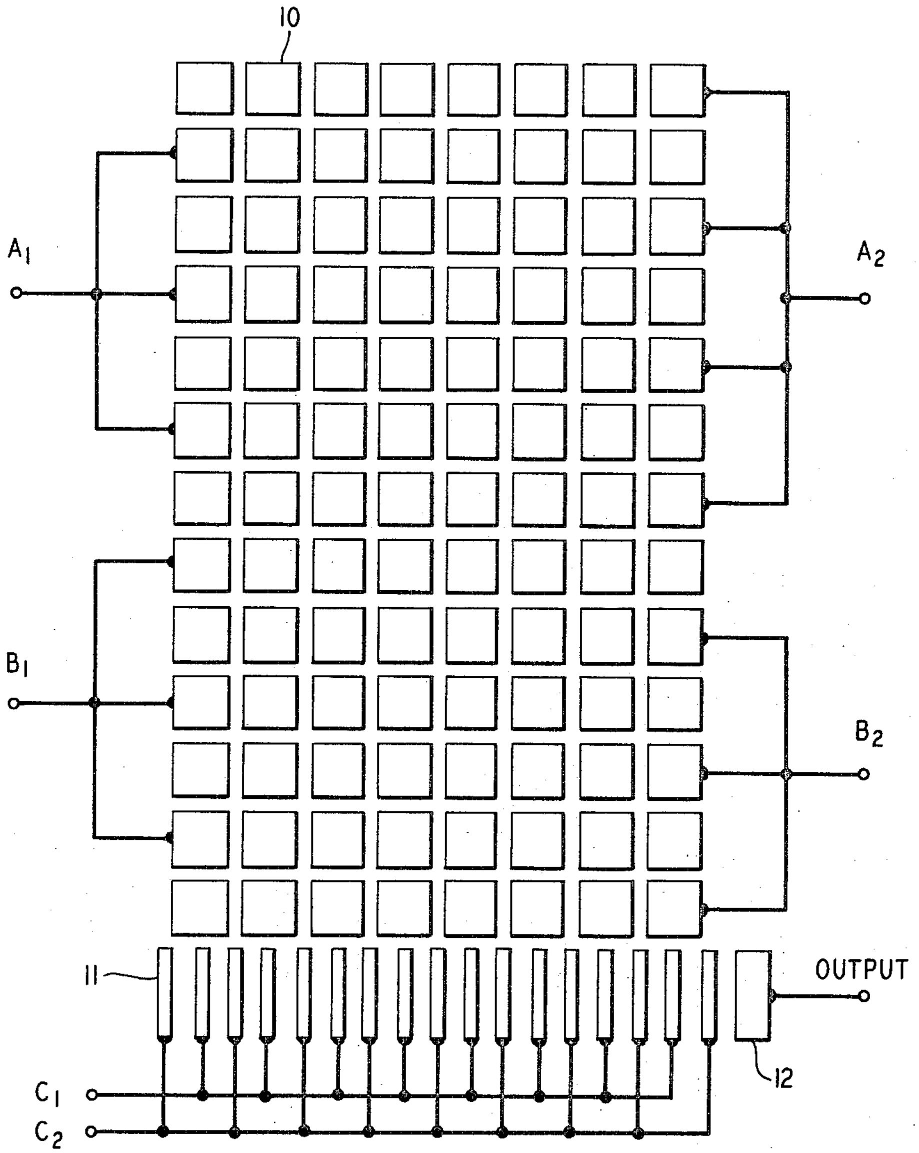
FIG. 1 is a schematic plan view of an area imaging device in accordance with one embodiment of the invention.

FIG. 1 shows the basic electrode configuration of the area imaging device in a plan view of one embodiment. The structure comprises an 8 × 13 array of CCD electrodes such as 10, a readout row of CCD electrodes such as 11, and some output means represented by electrode 12. Output means may take any of a variety of forms well known in the art. This array is presented for illustration purposes and extensions to much larger arrays should be obvious. Of course, the electrodes are disposed upon an insulating layer (not shown) which in turn overlies a charge storage medium (not shown) in accordance with the well known CCD concept. The electrodes are biased by conduction paths $A_1$, $A_2$, $B_1$, $B_2$, $C_1$, $C_2$, to which clock pulses are supplied at their respective terminals. This will be described in more detail below. Wherever paths $A_1$, $A_2$, $B_1$or $B_2$ are shown schematically coupled to an electrode in a row, it should be understood that the entire row of electrodes is electrically coupled to that path. Coupling to an entire row of electrodes may be accomplished by a variety of means. For example, each row may actually be a single strip of metal overlying the insulating layer, with individual columns being defined by vertical strips of diffused impurities in the semiconductor. The particular embodiment shown utilizes a two-phase drive mechanism. As is well known in the art, such an addressing scheme usually requires some asymmetry in the electrodes which will prevent backward flow of carriers. This assymmetry may, for example, take the form of charge implanted under each electrode. This is not shown in the figure for the sake of clarity.

The imaging device is basically of the frame transfer and store type. Thus, the top six rows in the array comprise the optical sensing array and the last eight rows, which are shielded from incident light by some means (not shown), comprise the storage and readout array. (For a detailed discussion of the frame transfer and store device, see U.S. Pat. application of M. F. Tompsett, supra). In the general operation of such a device, charge is collected in the semiconductor under certain rows in the optical sensing array by applying a bias to these rows. The entire frame is transferred to the storage array by successively biasing the rows of both arrays. Than, a line at a time is transferred to the last (readout) row in the storage array where the charge is transferred serially to the output means.

The device in accordance with the present invention modifies the operation in at least two important respects. First, in systems where equal resolution in the horizontal and vertical direction is called for, the aspect ratio is approximately 2 to 1. That is, in a unit cell the vertical dimension, which is the distance from a point on one electrode to a corresponding point on the next electrode in a column coupled to the same conduction path, is twice the horizontal dimension, which is the width of an electrode. Actually, a range of 1.5 – 2.5 to 1 is appropriate. A unit cell stores one element of information. By stretching the unit cell, in essence, two lines of information are combined in one row.

Second, while prior art devices contemplated integrating under the same rows in every integration period, the present device alternates integration under different rows. Thus, in a first field, charge is collected under the three rows coupled to path $A_1$. However, in a second field, charge is collected under the top three rows coupled to path $A_2$ (the fourth row being shielded from light). This shifts the center of charge collection in alternate fields by one-half the vertical dimension of the unit cell. The two fields are then interlaced in the final display.

The net effect of these inventive principles is that the embodiment shown in FIG. 1 performs a psuedo-interlacing operation compatible with a video system which will interlace three rows from each field. Prior art two-phase devices for such a system would require twelve rows in a sensing array wherein charge is collected under six rows and three of those six are read out in alternate fields. As mentioned previously, this is not compatible with a frame transfer and store operation.

Figure 2:
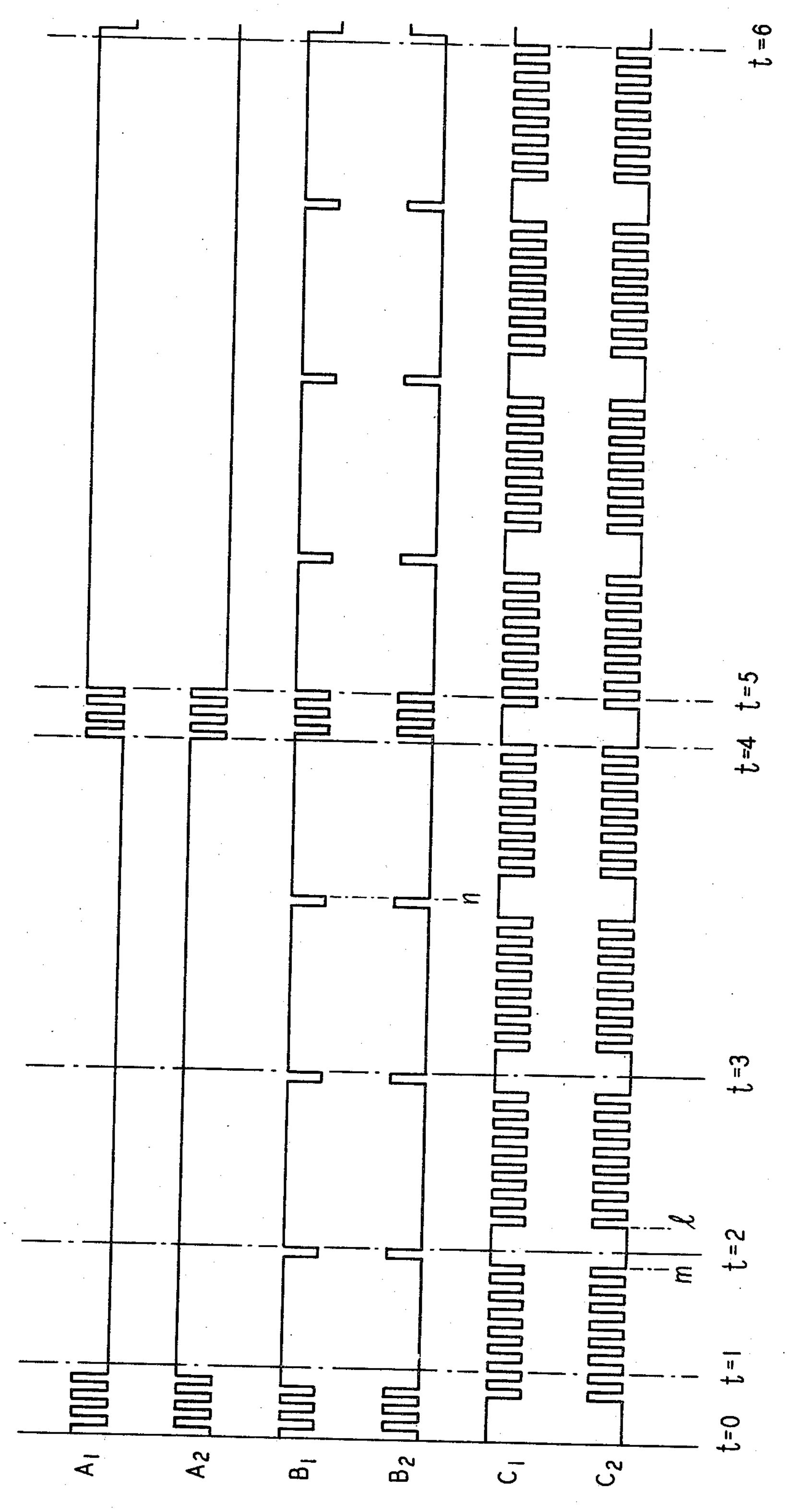
FIG. 2 is an illustration of the pulse train required to operate an area imaging device in accordance with the same embodiment.

The detailed operation of the present device can be seen by viewing FIG. 2 in conjunction with FIG. 1. FIG. 2 illustrates the pulsing sequence applied to each conduction path. The point $t = 0$ is chosen arbitrarily as the point in time when the device is about to transfer charge which has been accumulated under rows 2, 4 and 6 of the sensing array (those rows coupled to path $A_1$). In order to shift these rows of charge down into the storage array, pulses are supplied sequentially to paths $A_1$, $A_2$, $B_1$ and $B_2$. At time $t = 1$ the rows of charge now reside under the rows of the storage array coupled to path $B_1$ (rows 8, 10 and 12). In the meantime, pulses are sequentially supplied to $C_1$ and $C_2$ in order to clear out of the last row any residual charge from the previous frame.

From time $t = 1 - 4$, since a high potential is supplied to path $A_2$, the sensing array will collect charge under rows 1, 3 and 5. During this time, the charge in the storage array must be read out. Hence, a pulse is supplied sequentially to $B_1$ and $B_2$ too shift the charge down two rows. At $t = 2$, the row of charge which had been under row 12 is now under the last row of the array, Pulses are then supplied sequentially to $C_1$ and $C_2$. This moves the charge packets to the right in FIG. 1 where they are detected by the output means 12 and appear as a current at the terminal. The pulsing of $B_1$ and $B_2$ is repeated so that at time $t = 3$, another row of charge is transferred to the past row and this charge is then read out. The entire process is again repeated in order to read out the row of charge remaining in the store (originally residing under row 2 of the sensing array). Thus at time $t = 4$, the three rows from the first field have been read out and the store is empty.

At this point, the three rows of charge that have been accumulated in the meantime under rows 1, 3 and 5 are to be read out. Again $A_1$, $A_2$, $B_1$ and $B_2$ are pulsed sequentially to move these rows of charge into the storage area underneath the rows coupled to $B_1$ at $t = 5$. Then, while path $A_1$ is held at a high potential to accumulate charge under rows 2, 4 and 6 for the next field, the rows in the store are transferred in parallel to serial fashion as before to read out the information. At $t = 6$, the device is set to again read out rows 2, 4 and 6.

It will be noted that the pulse trains of $A_1$ and $A_2$, $B_1$ and $B_2$, and $C_1$ and $C_2$ are shown precisely 180° out of phase. It is known by those in the art that the pulses may overlap slightly to insure good transfer efficiency. The basic pulse program, however, remains the same.

Figure 3:
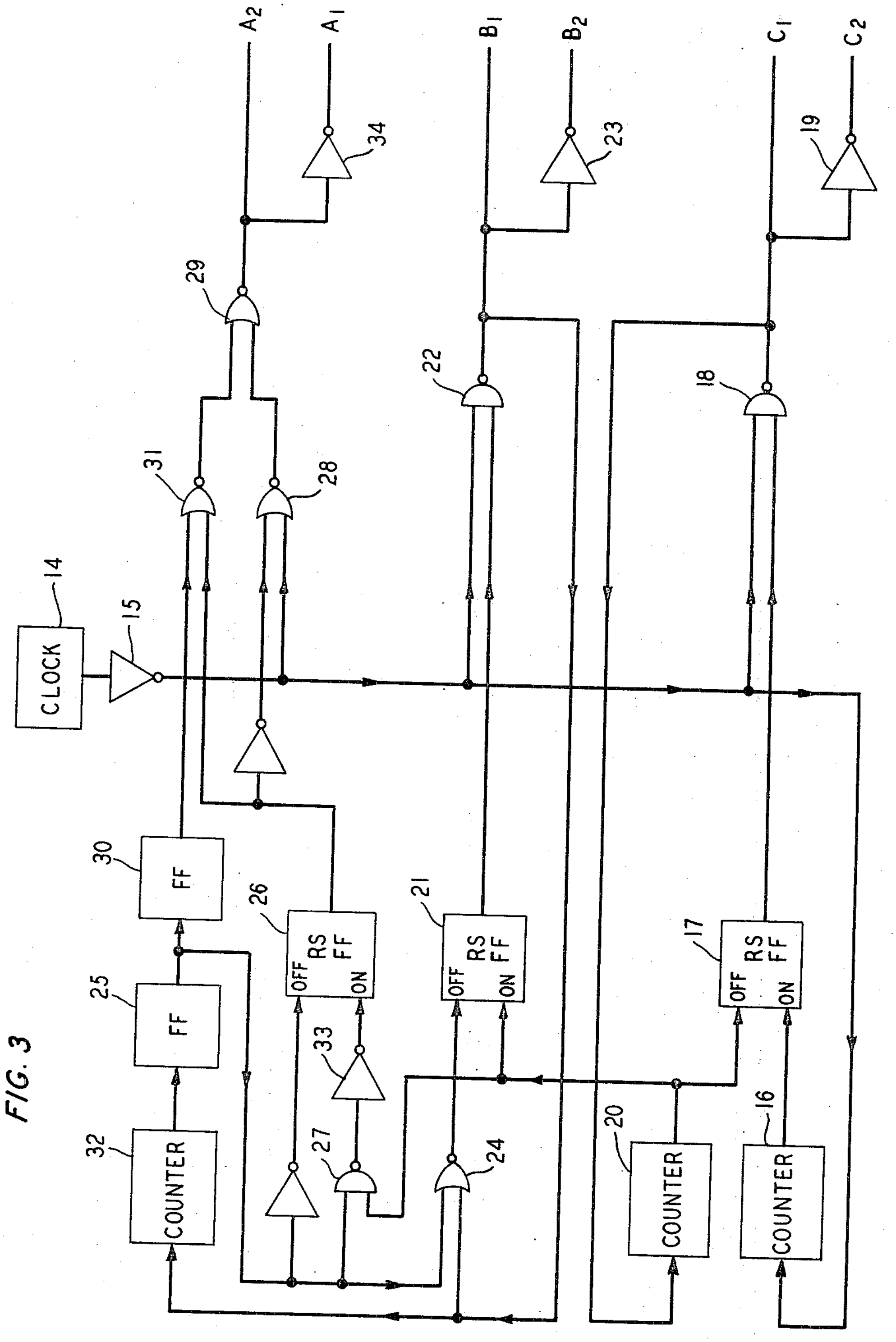
FIG. 3 is a schematic diagram of a logic circuit required to operate an area imaging device in accordance with the same embodiment.

FIG. 3 shows schematically a logic circuit which can drive the conduction paths in the manner described above. It should be emphasized that the circuit is but one example of the drive means, and many variations are possible.

Clock 14 produces a continuous train of pulses. The pulses are sent through inverter 15 to counter 16 which counts integers of "$l$" pulses. The letter "$l$" signifies the number of pulses produced during a full line time including horizontal retrace (see FIG. 2). When "$l$" pulses are counted, a pulse is sent which turns on Reset, Set Flip-Flop 17. This opens up NAND gate 18 which allows $C_1$ to be pulsed by the clock and $C_2$ to be pulsed in antiphase through inverter 19. The pulses supplied to $C_1$ are sent to counter 20 which counts integers of $m$ pulses. The letter $m$ represents the number of bits per line (in this embodiment, $m = 8$). When $m$ pulses are reached, RS Flip-Flop 17 is turned off and this closes NAND gate 18, putting $C_1$ at a high potential and $C_2$ at a low potential until $l$ pulses are again counted.

In the meantime, when $m$ pulses are counted, RS Flip-flop 21 is turned on. This in turn opens up NAND gate 22 and allows clock pulses to reach $B_1$ and the complement of $B_1$ to appear at $B_2$ through inverter 23. These pulses, however, are sent to NOR gate 24 which turns off RS Flip-flop 21 after only one pulse is supplied to $B_1$ and $B_2$. This is the portion of the program which shifts rows in the store down two rows at a time (e.g. $t = 2$ in FIG. 2).

The pulses which pass through NAND gate 22 are also sent to counter 32 which counts $n$ pulses. The letter $n$ represents the number of rows being integrated in a field (here $n = 3$). When $n$ pulses are counted, the state of Flip-Flop 25 is changed to "one" and this enables the next pulse from counter 20 to pass NAND gate 27 and inverter 33 to turn on RS Flip-Flop 26 simultaneously with RS Flip-flop 21. This is at $t = 4$ in FIG. 2. The pulse from RS Flip-Flop 26 opens NOR gate 28 and closes NOR gate 31. Thus, NOR gate 29 is opened, allowing $A_2$ to be pulsed by the clock and the complement to appear at $A_1$ through inverter 34. At the same time, NAND gate 22 has been opened to allow pulsing of $B_1$ and $B_2$. Paths $A_1$, $A_2$, $B_1$ and $B_2$ will continue to pulse as long as Flip-Flop 25 does not change state. This allows all charge in the sensing array under rows coupled to $A_2$ to be transferred into the store.

At $t = 5$, counter 32 has again counted $n$ pulses from NAND gate 22. Flip-flop 25, therefore, changes state again (to "0") turning off RS Flip-Flop 26 and 21. With RS Flip-Flop 26 turned off, NOr gate 28 is turned off and Nor gate 31 is turned on thus holding $A_2$ and $A_1$ at a constant potential until $t = 6$ when the transfer of the charge in the next field (rows coupled to $A_1$) is called for.

Whether $A_2$ or $A_1$ will integrate charge depends on the output of Flip-Flop 30. Since Flip-Flop 30 will change state every time a field is transferred into the storage area, $A_1$ and $A_2$ will alternatively be held at a high potential in one field and a low potential in the other field.

Figure 4:
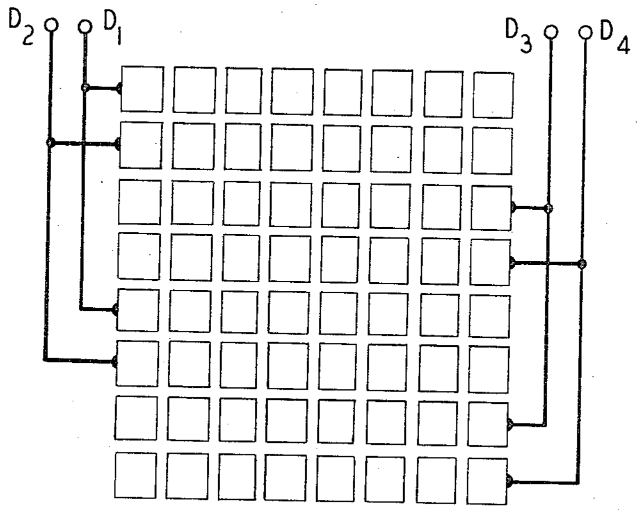
FIG. 4 is a schematic plan view of a portion of an area imaging device in accordance with a second embodiment of the invention.
Figure 5:
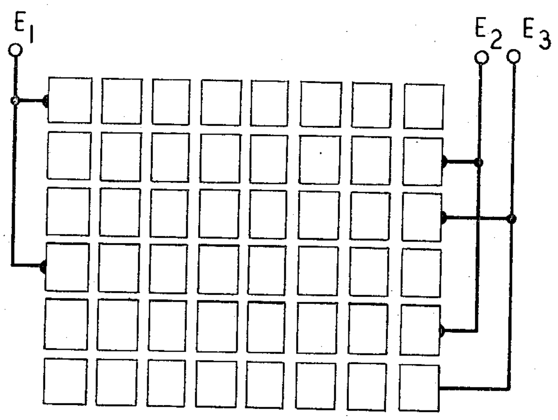
FIG. 5 is a schematic plan view of a portion of an area imaging in accordance with a third embodiment of the invention.

While the embodiment shown has employed a two-phase drive mechanism, it should be clear that the three-phase and four-phase devices may be similarly constructed. FIG. 4 is a schematic plan view of a portion of the sensing array of a four-phase area imaging device. It can be seen that in a four-phase device every fourth row in the sensing array is coupled to the same one of four conduction paths $D_1$, $D_2$, $D_3$ and $D_4$. In alternate fields, alternate pairs of adjacent rows may be integrated to shift the center of charge collection in the manner described for a two-phase device. Thus, in a first field charge is collected under the rows coupled to paths $D_1$ and $D_2$ and in a second field under the rows coupled to $D_3$ and $D_4$. Similarly, FIG. 5 gives a schematic plan view of a portion of the sensing array in a three-phase device. Every third row is coupled to the same one of three conduction paths labelled $E_1$, $E_2$ and $E_3$. In a first field, charge is collected under the rows coupled to path $E_1$ and in a second field charge is collected jointly under the rows coupled to paths $E_2$ and $E_3$. Furthermore, it should be noted that the drive mechanism in the storage array need not be the same as that of the sensing array. Thus, for example, a four-phase drive may be used in the sensing array and a three-phase drive in the storage array.

Figure 6:
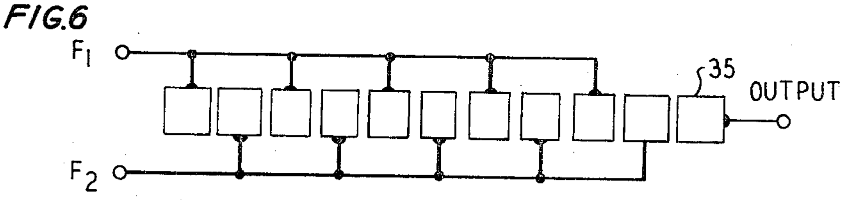
FIG. 6 is a schematic plan view of a line imaging device in accordance with a fourth embodiment of the invention.
Figure 7:
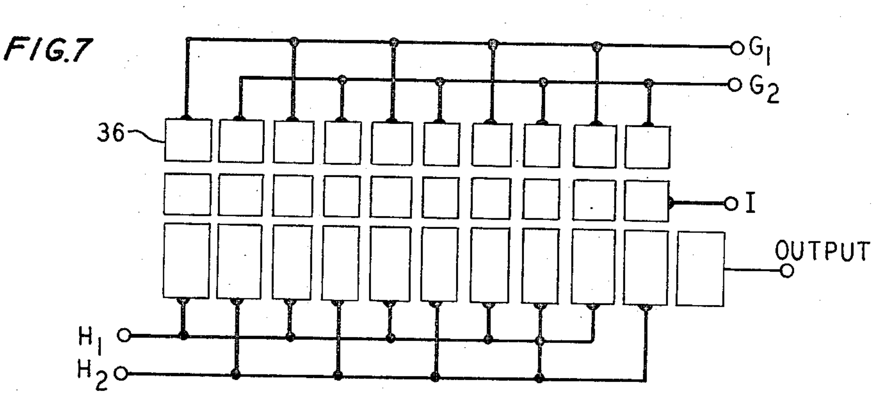
FIG. 7 is a schematic plan view of a line imaging device in accordance with a fifth embodiment of the invention.

It should also be clear that the principles discussed herein may be utilized in a line imaging device. One embodiment of such a device is shown in FIG. 6 and is simply one column of electrodes in FIG. 1 with some output means represented by electrode 35 placed at the end of the column. A further embodiment shown in FIG. 7 could comprise three rows of electrodes with the first row of electrodes 36 acting as a sensing array and the other two rows as a storage and readout array similar to the area imaging device shown in FIG. 1. (See also, application of Tompsett, supra). In either case, alternate electrodes in the sensing row or column would integrate in alternate fields in the manner previously described. Thus, in FIG. 6, charge is collected under electrodes coupled to path $F_1$ in a first field and under electrodes coupled to path $F_2$ in a second field. In FIG. 7 charge is collected under electrodes coupled to $G_1$ in a first field and under electrodes coupled to $G_2$ in a second field. Collected charge is moved down into the serial readout row by pulsing conductor I (which is coupled to all of the electrodes of the second row) and either $H_1$ or $H_2$. The vertical transfer paths in this embodiment are defined by vertical strips of fixed charge (not shown) between the electrode as is well known in the art. (See application of M. F. Tompsett, supra). In both embodiments of the line imaging device, the primary advantage is that a reduction in the number of electrodes is permitted over prior art devices giving the same resolution.

In all of these alternative embodiments, it will be appreciated that variations in the logic circuitry are required. However, such variations are well within the knowledge of those skilled in the art and so a more detailed discussion is omitted for the sake of brevity.

It should also be pointed out that while the present device has been described in terms of a system utilizing an aspect ratio of 2:1, in some video systems a 1:1 ratio is called for. The latter ratio is required where the vertical resolution must be twice the horizontal. It should be obvious then, that the present devices could also be designed with an aspect ratio of 1:1.

Finally, it will be appreciated that while the embodiments have been described in terms of CCDs, any of the electrode configurations and the operation of the devices described are equally applicable to BBDs by simply providing the proper regions of fixed charge in the medium. The application to BBDs is straightforward and consequently a detailed description of this point is omitted.

Various additional modifications and extensions will become apparent to those skilled in the art. All such deviations which basically rely on the teachings through which the invention has advanced the art should properly be considered within the spirit and scope of the invention.

What is claimed is:

1. A charge transfer imaging device comprising a charge storage medium, an insulating layer covering at least a portion of one surface of said medium, means for forming localized integration sites in said medium for the collection of mobile charge carriers in response to light incident on said medium comprising an array of electrodes disposed upon said layer, means for projecting an image onto one surface of said storage medium, conduction means for biasing sets of electrodes of said array during an integration period, and conduction means for sequentially biasing series of electrodes and of said array so as to transfer said charge carriers out of said integration sites, characterized in that said device further includes circuit means for alternately biasing different sets of electrodes during alternate integration periods.

2. The device according to claim 1 wherein the array of electrodes comprises a first array comprising an optical sensing array and a second array comprising a storage and readout array, the area of the medium beneath said second array being shielded from incident light.

3. The device according to claim 2 wherein the first array comprises a plurality of rows of electrodes and said circuit means comprises means for alternately biasing different rows of electrodes during alternate integration periods.

4. The device according to claim 3 weherein the conduction means for biasing electrodes of said first array comprises two conduction paths each coupled to a different one of every other row of electrodes in said array, and said circuit means comprises means for alternately biasing a different conduction path in alternate integration periods.

5. The device according to claim 3 wherein the conduction means for biasing electrodes of said first array comprises three conduction paths each coupled to a different one of every third row of electrodes in said array, and said circuit means comprises means for alternately biasing one conduction path and the remaining two conduction paths during alternate integration periods.

6. The device according to claim 3 wherein the conduction means for biasing electrodes of siad first array comprises four conduction paths each coupled to a different one of every fourth row of electrodes in the array, and said circuit means comprises means for alternately biasing a different pair of conduction paths coupled to adjacent rows of electrodes during alternate integration periods.

7. The device according to claim 2 wherein the first array comprises a single row of electrodes and said circuit means comprises means for alternately biasing a different set of electrodes in that row during alternate integration periods.

8. The device according to claim 1 wherein the vertical dimension of a unit cell in said array is in the range of 1.5 –2.5 times the horizontal dimension.

9. A charge transfer area imaging device for use in an interlaced video system comprising a charge storage medium, an insulating layer covering at least a portion of one surface of said medium, a first array of metal electrodes comprising a plurality of columns of electrodes formed on said insulating layer, said electrodes adapted to form a plurality of columns of localized integration sites in said medium for the collection of mobile charge carriers in response to light incident on said medium and to transfer said carrier in a direction essentially parallel to the surface of said medium out of the area under said first array when a suitable bias is supplied to said electrodes, a second array of metal electrodes comprising a plurality of columns of electrodes formed on said insulating layer over an area of the storage medium contiguous to the area under said first array and wherein the surface of said medium beneath said second array is shielded from incident light, each column of said second array being positioned so as to receive in the medium thereunder said charge carriers from beneath a corresponding column of said first array, means for projecting an image onto one surface of said medium, conduction means for biasing certain rows of electrodes of said first array during an integration period, and conduction means for sequentially biasing the electrodes of said first and second arrays so as to transfer said columns of charge carriers out of the area under said first array to beneath corresponding columns of said second array, characterized in that said device further includes circuit means for alternately biasing different rows of electrodes of said first array during alternate integration periods so as to collect charge carriers in a pattern which may be displayed in two interlaced field in a video system.

10. The device according to claim 9 wherein the conduction means for biasing electrodes of said first array comprises two conduction paths each coupled to a different one of every other row of electrodes in said array and said circuit means comprises means for alternately biasing a different conduction path in alternate integration periods.

11. The device according to claim 9 wherein the conduction means for biasing electrodes of said first array comprises three conduction paths each coupled to a different one of every third row of electrodes in said array, and said circuit means comprises means for alternately biasing one conduction path and the remaining two conduction paths during alternate integration periods.

12. The device according to claim 9 wherein the conduction means for biasing electrodes of said first array comprises four conduction paths each coupled to a different one of every fourth row of electrodes in the array, and said circuit means comprises means for alternately biasing a different pair of conduction paths coupled to adjacent rows of electrodes during alternate integration periods.

13. The device according to claim 9 wherein the vertical dimension of a unit cell in said first array is in the range of 1.5 – 2.5 times the horizontal dimension.

* * * * *